United States Patent
Yamaki et al.

(10) Patent No.: US 9,459,109 B2
(45) Date of Patent: Oct. 4, 2016

(54) NAVIGATION DEVICE

(71) Applicant: Alpine Electronics, Inc., Tokyo (JP)

(72) Inventors: Katsuhiko Yamaki, Iwaki (JP); Yukio Sato, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 45 days.

(21) Appl. No.: 14/281,094

(22) Filed: May 19, 2014

(65) Prior Publication Data
US 2015/0039219 A1  Feb. 5, 2015

(30) Foreign Application Priority Data
Jul. 30, 2013  (JP) ................. 2013-157969

(51) Int. Cl.
G07B 15/06 (2011.01)
G01C 21/36 (2006.01)
G01C 21/34 (2006.01)
G06Q 10/00 (2012.01)

(52) U.S. Cl.
CPC .......... *G01C 21/3461* (2013.01); *G07B 15/06* (2013.01); *G06Q 10/00* (2013.01); *G07B 15/063* (2013.01)

(58) Field of Classification Search
CPC .......... G01C 21/3461; G01C 21/3626; G01C 21/36; G01C 21/3484; G06Q 30/04; G08G 1/207
USPC ....... 701/400, 411, 414, 300, 533, 410, 425; 705/30
See application file for complete search history.

(56) References Cited

U.S. PATENT DOCUMENTS

| | | | | |
|---|---|---|---|---|
| 6,269,303 B1 * | 7/2001 | Watanabe | .......... | G01C 21/3461 340/988 |
| 2002/0052689 A1 * | 5/2002 | Yamashita | ............. | G01C 21/34 701/411 |
| 2007/0021905 A1 * | 1/2007 | Takashima | .......... | G01C 21/3484 701/533 |
| 2009/0024321 A1 * | 1/2009 | Bando | ..................... | G01C 21/36 701/414 |
| 2012/0265430 A1 * | 10/2012 | Weimann | ............... | G08G 1/207 701/300 |
| 2013/0030964 A1 * | 1/2013 | Nuzzi | ..................... | G06Q 30/04 705/30 |
| 2013/0035850 A1 * | 2/2013 | He | ..................... | G01C 21/3461 701/425 |

FOREIGN PATENT DOCUMENTS

JP  2001-056230  2/2001
JP  2002-116038  4/2002

* cited by examiner

*Primary Examiner* — Yuri Kan
(74) *Attorney, Agent, or Firm* — Brinks Gilson & Lione

(57) ABSTRACT

A navigation device, when a vehicle travels through an area in which the use of an ETC device provided in the vehicle is not possible, can prevent that vehicle from being guided along an ETC device utilization rout. The navigation device sets, for each area, whether or not the use of the ETC device is possible; performs a first route search using a first cost condition regarding the route cost of an ETC device utilization route; performs a second route search using a second cost condition regarding a route cost for which the route cost of an ETC device utilization route is higher than with the first cost condition; and, on the basis of a setting status for whether or not the use of the ETC device in each area is possible, controls whether to perform the first route search or the second route search.

14 Claims, 13 Drawing Sheets

| AREA | ETC DEVICE USABILITY |
|---|---|
| EA | ○ |
| EB | — |
| EC | — |
| ED | — |
| EF | — |
| ⋮ | ⋮ |

FIG. 7

AN ETC DEVICE UTILIZATION ROUTE IS INCLUDED IN THE ROUTE IN AREA EB.
THERE IS A POSSIBILITY OF A FINE BEING IMPOSED IF NOT REGISTERED FOR USE.

SET AREA EB AS AN ETC DEVICE USABLE AREA?

| YES | NO | DETAILS |

FIG. 8

| AREA | ETC DEVICE USABILITY |
|------|----------------------|
| EA   | ○                    |
| EB   | ×                    |
| EC   | —                    |
| ED   | ×                    |
| EF   | ×                    |
| ⋮    | ⋮                    |

NAVIGATION DEVICE

RELATED APPLICATION

The present application claims priority to Japanese Patent Application Number 2013-157969, filed Jul. 30, 2013, the entirety of which is hereby incorporated by reference.

BACKGROUND

1. Field of the Invention

The present invention relates to a navigation device that searches for a route from the current location of a vehicle to a destination, and guides the vehicle along a retrieved route.

2. Description of the Related Art

Ordinary navigation devices mounted in vehicles search for a route from the current location of that vehicle to a destination, and guide the vehicle along a retrieved route. To date, various innovations have been proposed in these kinds of navigation devices. For example, in the navigation devices disclosed in JP 2001-56230 A and JP 2002-116038 A, if a vehicle that, at first, is traveling along a route obtained by an expressway-priority route search has transferred from an expressway on that route onto an ordinary road that is not part of that route due to a reason such as a traffic jam, a reroute search (reroute) is performed with ordinary road priority but not expressway priority, and route guidance for the vehicle continues to be performed along the route obtained by that reroute search. According to this kind of navigation device, in the case where a user (driver) has performed a driving operation and the vehicle has transferred from an expressway on that route onto an ordinary road that is not part of that route due to a reason such as a traffic jam, it is possible to prevent a route that includes an expressway on which a traffic jam is anticipated from being retrieved once again.

In the United States of America (USA), for example, there are corporations that provide electronic toll collection (ETC) systems, and the states in which ETC devices can be used are different for each of those corporations. ETC devices provided by some corporations cannot be used in all of the states in the USA, and the states in which use is possible from among all of those states are limited. There are cases where a fine may be imposed when a vehicle in which such an ETC device is mounted travels along an ETC device utilization road in a state in which that ETC device cannot be used.

In a navigation device mounted in a vehicle provided with an ETC device for which the usable areas (for example, states) from among a plurality of areas (for example, all of the states in the USA) are limited such as that described above, there are cases where a route that passes through a plurality of areas is obtained when a search is performed for a route from the current location of the vehicle to a destination. In these cases, a situation may arise in which the vehicle that is route-guided along that route travels along an ETC device utilization road in an area in which the mounted ETC device cannot be used. To date, no proposals have been made for a navigation device that prevents this kind of situation.

SUMMARY

The present disclosure takes such circumstances into consideration, and provides a navigation device that can prevent a vehicle from being guided along an ETC device utilization route when that vehicle travels through an area in which the use of the ETC device provided in the vehicle is not possible.

A navigation device according to an embodiment of the present invention is mounted in a vehicle provided with an ETC device for which the usable areas from among a plurality of areas are limited, searches for a route from the current location of the vehicle to a destination, and guides the vehicle along a retrieved route. The navigation device is configured to include: an ETC usability setting means that sets, for each area, whether or not the use of the ETC device is possible; a first route searching means that performs a route search in accordance with a first cost condition including a condition regarding the route cost of an ETC device utilization route; a second route searching means that performs a route search in accordance with a second cost condition including a condition regarding a route cost with which the route cost of an ETC device utilization route is higher than with the first cost condition; and a control means that, on the basis of a setting status for whether or not the use of the ETC device in each area according to the ETC usability setting means is possible, controls whether to perform a route search by means of the first route searching means or the second route searching means.

According to this kind of configuration, whether or not the use of an ETC device provided in a vehicle is possible can be set for each area. Then, on the basis of the setting status for whether or not the use of the ETC device in each of those areas is possible, a route search from the current location of the vehicle to the destination is performed in accordance with either a first cost condition including a condition regarding the route cost of an ETC device utilization route, or a second cost condition including a condition regarding a route cost with which the route cost of an ETC device utilization route is higher than with the first cost condition. Thus, in an area in which the use of the ETC device is not possible, it becomes possible to perform a route search in accordance with the second cost condition with which the route cost of an ETC device utilization route is higher than with the first cost condition, and, as a result, in the area in which the use of the ETC device is not possible, it becomes possible to make it difficult for an ETC device utilization route to be included in a retrieved route.

In the navigation device according to an embodiment of the present invention, the ETC usability setting means has an area entry setting means that, when a vehicle that is guided along a retrieved route enters an area in which a setting for whether or not the use of the ETC device is possible has not been performed, sets whether or not the use of the ETC device is possible for the area. According to this kind of configuration, when a vehicle that is guided along a retrieved route enters an area in which whether or not the use of an ETC device is possible has not been set, whether or not the use of the ETC device is possible is set for the area. A vehicle entering an area in which whether or not the use of an ETC device is possible has not been set may include the case where the vehicle enters a distance range from immediately before actually entering that area to immediately after having actually entered that area.

In the navigation device according to an embodiment of the present invention, the area entry setting means can be configured to, when a vehicle that is guided along a route retrieved by the first route searching means enters an area in which a setting for whether or not the use of the ETC device is possible has not been performed, if an ETC device utilization route is included in a portion of the route in the area, set whether or not the use of the ETC device is possible for the area.

According to this kind of configuration, when a vehicle that is guided along a route retrieved in accordance with the first cost condition with which the route cost of an ETC device utilization route is lower than with the second cost condition, namely, a route retrieved in accordance with a condition with which it is easier for an ETC device utilization route to be included than with the second cost condition, enters an area in which whether or not the use of an ETC device is possible has not been set, if an ETC device utilization route is included in a portion of the route in that area, a setting for whether or not the use of the ETC device is possible is performed for the area. For example, if a setting indicating that use of the ETC device is not possible is performed for the area, thereafter, on the basis of the setting indicating that use of the ETC device is not possible for that area, for example, a re-search for a route can performed in accordance with the second cost condition, namely, a condition with which it is more difficult for an ETC device utilization route to be included than with the first cost condition. Furthermore, for example, if a setting indicating that use of the ETC device is possible is performed for the area, thereafter, on the basis of the setting indicating that use of the ETC device is possible for the area, route guidance according to a route obtained by a search according to the first cost condition can be maintained.

In the navigation device according to an embodiment of the present invention, the ETC usability setting means can be configured to have a selection setting means that selects an area from the plurality of areas, and sets that the use of the ETC device is possible for the selected area.

According to this kind of configuration, at an appropriate timing after the navigation device has been activated, a setting indicating that the use of the ETC device is possible for the area selected from the plurality of areas can be performed.

In the navigation device according to an embodiment of the present invention, the ETC usability setting means can be configured to have an area travel setting means that, if the vehicle that is guided along a route retrieved by the second route searching means travels along an ETC device utilization route instead of an ETC device non-utilization route included in that route, sets an area including that ETC device utilization route as an area in which the use of the ETC device is possible. According to this kind of configuration, if a vehicle that is guided along a route retrieved in accordance with the second cost condition for which the route cost of an ETC device utilization route is higher than with the first cost condition travels along an ETC device utilization route instead of an ETC device non-utilization route included in that route due to a driving operation by the user (driver), an area including that ETC device utilization route is set as an area in which the use of the ETC device is possible.

In the navigation device according to an embodiment of the present invention, the area travel setting means can be configured to, if the vehicle is guided along an ETC device utilization route included in a route for which a re-search is performed by the second route searching means in accordance with the travel route of the vehicle, set an area including that ETC device utilization route as an area in which the use of the ETC device is possible. According to this kind of configuration, when a vehicle that is guided along a route retrieved in accordance with the second cost condition for which the route cost of an ETC device utilization route is higher than with the first cost condition deviates and travels away from that route, if an ETC device utilization route is included in a route for which a re-search is performed in accordance with the second cost condition and in accordance with that travel route, and the vehicle is guided along the route including that ETC device utilization route, an area including that ETC device utilization route is set as an area in which the use of the ETC device is possible.

In the navigation device according to an embodiment of the present invention, the ETC usability setting means can be configured to have a route search setting means that, when a search is performed for a route by either the first route searching means or the second route searching means, if the retrieved route passes through an area in which a setting for whether or not the use of the ETC device is possible has not been performed, sets whether or not the use of the ETC device is possible for that area. According to this kind of configuration, when a route search is performed in accordance with either the first cost condition including a condition for the route cost of an ETC device utilization route or the second cost condition for which the route cost of an ETC device utilization route is higher than with the first cost condition, for example, before guidance for the vehicle along the route obtained by the route search starts, whether or not the use of the ETC device is possible is set for an area through which the retrieved route passes.

In the navigation device according to an embodiment of the present invention, the control means can be configured to, when the vehicle that is guided along a route retrieved by the first route searching means enters an area in which a setting indicating that the use of the ETC device is not possible has been performed by the ETC usability setting means, if an ETC device utilization route is included in a portion of the route in the area, cause the second route searching means to search for a new route from the current location of the vehicle to the destination, and guide the vehicle along that new route. According to this kind of configuration, when the vehicle that is guided along a route retrieved in accordance with the first cost condition for which the route cost of an ETC device utilization route is lower than with the second cost condition enters an area in which a setting indicating that use of the ETC device is not possible has been performed, if an ETC device utilization route is included in a portion of the route in the area, the vehicle is not guided along that ETC device utilization route, and a new route from the current location of the vehicle to the destination is retrieved in accordance with the second cost condition for which the route cost of an ETC device utilization route is higher than with the first cost condition, and the vehicle is guided along that new route.

In the navigation device according to an embodiment of the present invention, the control means can be configured to have a first initial control means that, if the current location of the vehicle at the time of departure is included in an area in which the use of the ETC device is possible according to the ETC usability setting means, causes the first route searching means to search for a route from the current location to the destination. According to this kind of configuration, if the current location of the vehicle at the time of departure is included in an area in which the use of the ETC device is possible, a route from the current location to the destination is retrieved in accordance with the first cost condition for which the route cost of an ETC device utilization route is lower than with the second cost condition.

In the navigation device according to an embodiment of the present invention, the control means can be configured to have a second initial control means that, if the current location of the vehicle at the time of departure is included in an area in which the use of the ETC device is not possible according to the ETC usability setting means, causes the second route searching means to search for a route from the current location to the destination. According to this kind of configuration, if the current location of the vehicle at the time of departure is included in an area in which the use of the ETC device is not possible, a route from the current location to the destination is retrieved in accordance with the second cost condition for which the route cost of an ETC device utilization route is higher than with the first cost condition.

According to the navigation device according to embodiments of the present invention, whether or not the use of an ETC device provided in a vehicle is possible can be set for each area, and on the basis of a setting status for whether or not the use of the ETC device in each of those areas is possible, a route search from the current location of the vehicle to the destination is performed in accordance with either a first cost condition including a condition regarding the route cost of an ETC device utilization route, or a second cost condition including a condition regarding a route cost for which the route cost of an ETC device utilization route is higher than with the first cost condition, and it therefore becomes possible to perform a route search in accordance with the second cost condition for which the route cost of an ETC device utilization route is higher than the case of the first cost condition, with regard to an area in which the use of the ETC device is not possible. As a result, in an area in which the use of the ETC device is not possible, it can be made to be difficult for an ETC device utilization route to be included in a retrieved route, and when the vehicle travels through an area in which the use of the ETC device provided in the vehicle is not possible, that vehicle can be prevented from being guided along an ETC device utilization route.

BRIEF DESCRIPTION OF THE DRAWINGS

FIG. 7 is a drawing depicting an example of a display screen for performing, in the situation depicted in FIG. 6, a setting for whether or not the use of an ETC device is possible;

FIG. 8 is a drawing depicting an example of an ETC device usability setting table when, in the situation depicted in FIG. 6, it has been set that the use of an ETC device is not possible with respect to the area into which the vehicle is entering;

DETAILED DESCRIPTION

An embodiment of the present invention is described using the drawings.

Figure 1:
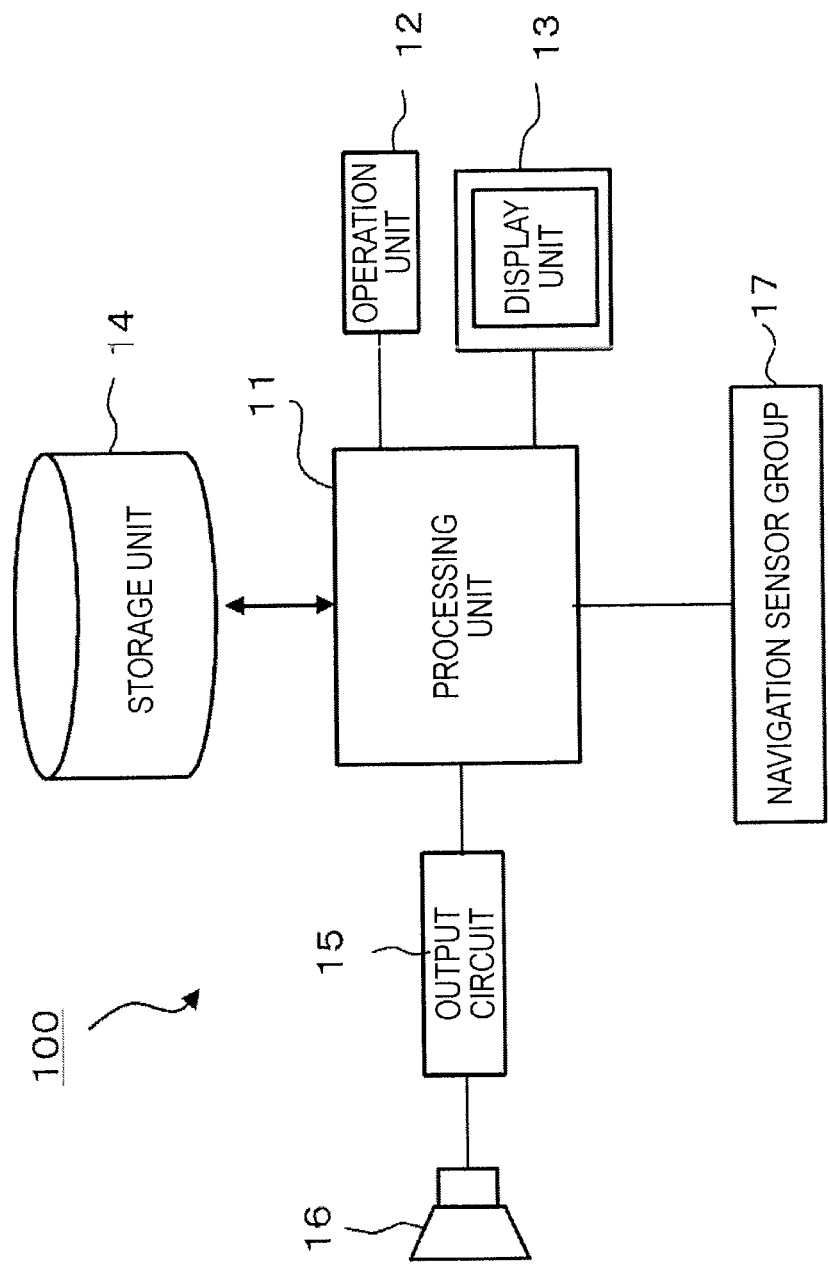
FIG. 1 is a block diagram depicting the configuration of a navigation device according to an embodiment of the present invention.

A navigation device according to an embodiment of the present invention is configured as depicted in FIG. 1. This navigation device 100 is mounted in a vehicle provided with an ETC device. With this ETC device, the areas in which use is possible from among a plurality of areas are limited, in the same way that the states in which use is possible from among all of the states in the USA are limited.

In FIG. 1, this navigation device 100 has a processing unit 11 that is constituted by a computer unit (including a CPU). The processing unit 11 is connected to a navigation sensor group 17 of a GPS receiver, an acceleration sensor, a wheel speed sensor, a gyroscope and so forth, and, furthermore, is connected to a storage unit 14 (for example, a hard disk drive). A variety of information required for processing by the processing unit 11 such as map information including road link information, and information required for the map display of information and so forth regarding facilities, route searching, and navigation processing is stored in the storage unit 14.

The processing unit 11 is connected to a display unit 13 that is constituted by an LCD or the like and displays a variety of information, an operation unit 12 that is constituted by a touch panel and an operation button and so forth on the display unit 13 and is used for inputting instructions and a variety of information for processing, and an output circuit 15 that is connected to a speaker 16. The processing unit 11 causes a map to be displayed on the display unit 13 on the basis of the map information and information relating to facilities and so forth stored in the storage unit 14, performs processing for searching for a route to a facility designated as a destination by operating the operation unit 12, and, in addition, detects the location of the vehicle on the basis of various detection signals from the navigation sensor group 17, and uses that detection location information and map information to perform route guidance processing for guiding the vehicle along the route obtained by the search. The processing unit 11 then, by means of the route guidance processing, causes the display unit 13 to display a map and also a mark representing the location of the vehicle, and outputs an audio signal to the output circuit 15 in such a way that audio guidance for guiding the vehicle along the route is output from the speaker 16.

Figures 2, 3:
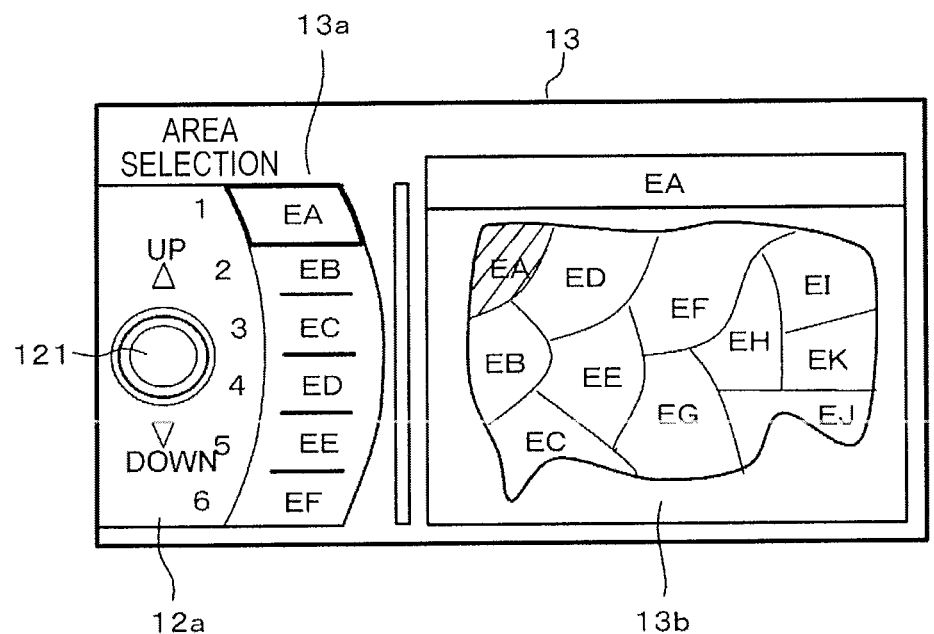
FIG. 2 is a drawing depicting an example of an ETC device usability setting screen.
FIG. 3 is a drawing depicting an example of an ETC device usability setting table.

On the basis of the control performed by the processing unit 11 based on a predetermined operation by the operation unit 12, an ETC device usability setting screen (ETC usability setting means/selection setting means), such as that displayed in FIG. 2, for setting whether or not the use of an ETC device provided in the vehicle is possible for each area (for example, the states in the USA) is displayed on the display unit 13. This ETC device usability setting screen may include an area selection screen portion 13a for selecting an area for which a setting is to be performed for whether or not the use of an ETC device is possible, and an area display screen portion 13b that displays all areas (for example, all of the states in the USA) for which a setting can be performed for whether or not the use of an ETC device is possible.

A setting button 121 and a cursor movement button (UP, DOWN) are formed in a portion 12a of the operation unit 12 (touch panel) corresponding to the area selection screen portion 13a. Furthermore, in the area selection screen portion 13a, character strings (EA, EB, EC, . . . ) that specify areas are arranged side-by-side in the vertical direction, and a character string (for example, EA) that specifies a selected area is surrounded (indicated) by a border shaped cursor. Then, by operating the cursor movement button (UP, DOWN), the cursor indicating a character string moves, and the selected area can be changed. The setting button 121 is an operation button for setting whether or not the use of an ETC device is possible with respect to the selected area, and, for example, when a touch operation is performed once with respect to the setting button 121, the area selected at that time (area EA in the case depicted in FIG. 2) is set as an area in which the use of an ETC device is possible. Furthermore, for example, when a touch operation is performed twice in succession with respect to the setting button 121, the area selected at that time is set as an area in which the use of an ETC device is not possible. Moreover, in this ETC device usability setting screen, it is permissible to only set that the use of an ETC device is possible for each area.

An ETC device usability setting table such as that depicted in FIG. 3 is saved in the storage unit 14 or an internal memory (for example, writable nonvolatile memory) of the processing unit 11. Information (ETC device usability information) indicating whether or not the use of an ETC device is possible that is set for each area (EA, EB, EC, . . . ) is recorded in this ETC device usability setting table. Moreover, in the ETC device usability setting table depicted in FIG. 3, information (symbol "◯") indicating that the use of an ETC device is possible with respect to the area EA is recorded, and a setting for whether or not the use of an ETC device is possible has not been performed with respect to the other areas EB, EC, . . . (symbol "—").

Moreover, the setting for whether or not the use of an ETC device is possible for each area for which the ETC device usability setting screen depicted in FIG. 2 is used can be performed at an arbitrary timing during operation of the navigation device 100.

Figure 4A:
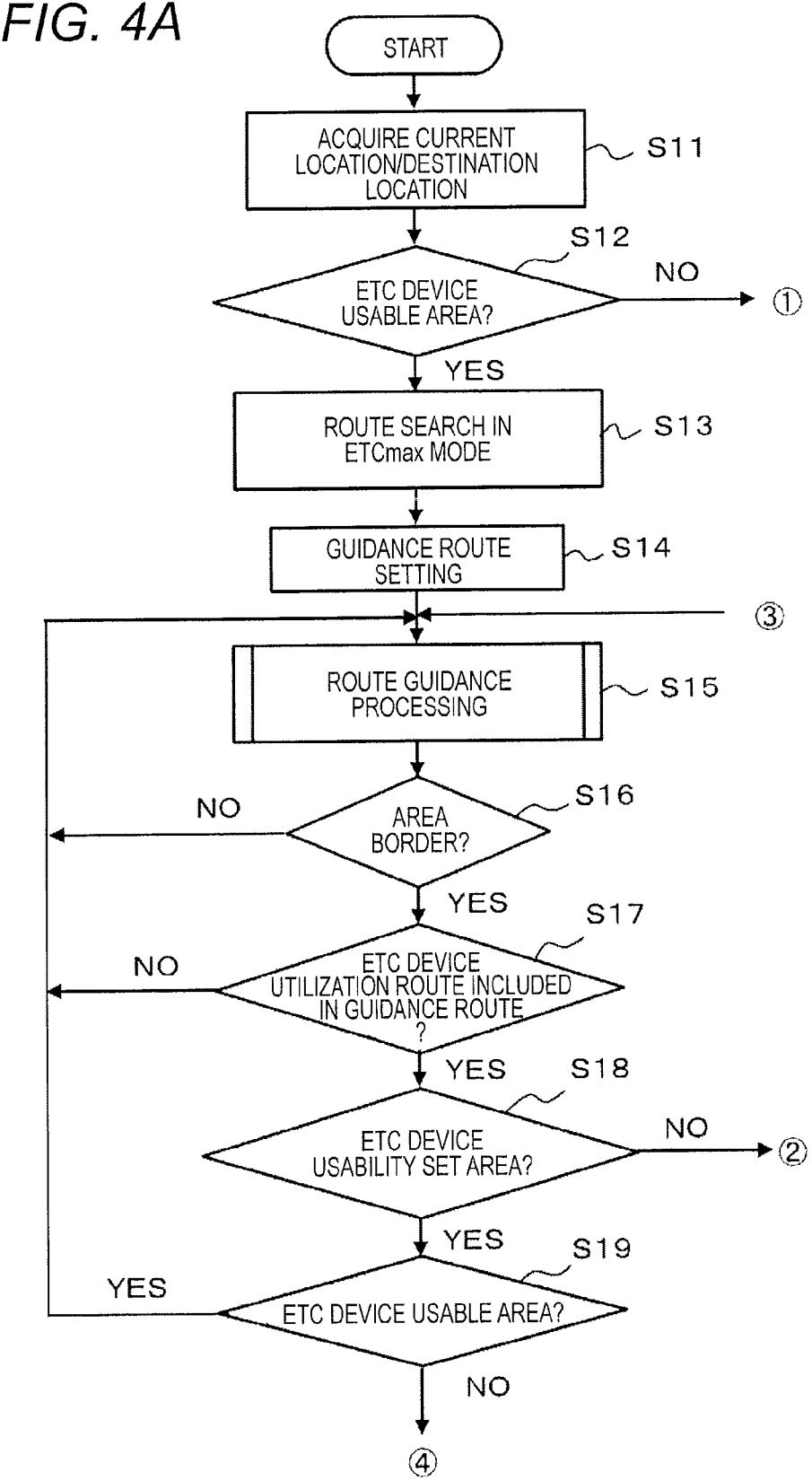
FIG. 4A is a flowchart depicting the flow of a first portion of processing according to control regarding route searching and route guidance.
Figure 4B:
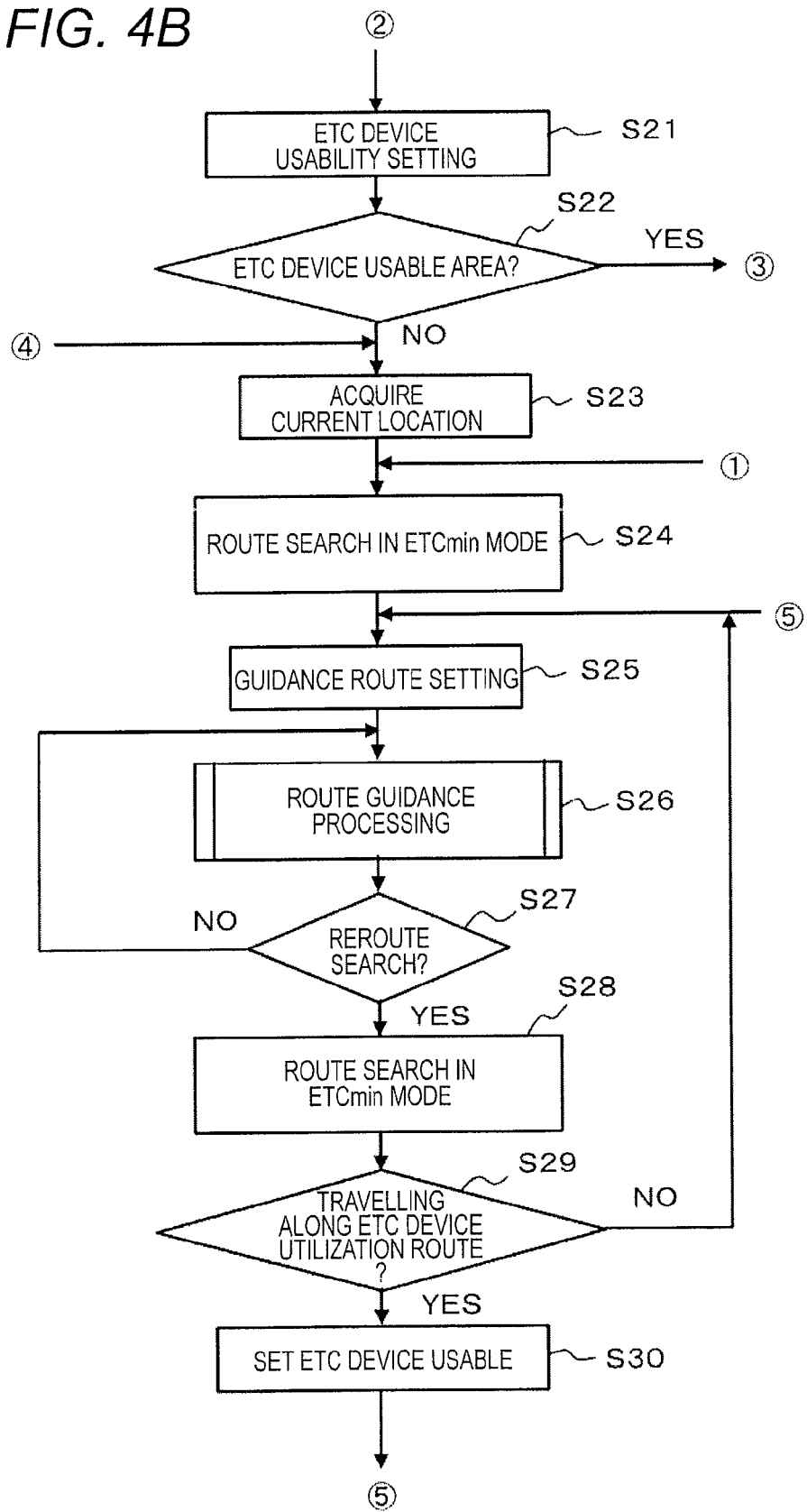
FIG. 4B is a flowchart depicting the flow of a second portion of processing according to control regarding route searching and route guidance.

The processing unit 11 performs control processing for route searching and route guidance in accordance with the procedures depicted in FIG. 4A and FIG. 4B.

When the navigation device 100 is activated and a predetermined operation is performed by means of the operation unit 12, the processing unit 11 starts control processing for route searching and route guidance. In FIG. 4A, the processing unit 11 acquires the current location of the vehicle on the basis of detection signals from the navigation sensor group 17, and also acquires the location of the destination designated by an operation performed by means of the operation unit 12 (S11). The processing unit 11 refers to the ETC device usability setting table (see FIG. 3), and determines whether or not the area to which the current location belongs is an area in which the use of an ETC device is possible (S12). If the current location of the vehicle is an area in which the use of an ETC device is possible (YES in S12), the processing unit 11 (including the control means/first initial control means) performs a route search from the current location to the destination in an ETCmax mode (S13: first route searching means). In the ETCmax mode, a route search is performed in accordance with a first cost condition including a condition regarding the route cost of an ETC device utilization route that is decided in such a way that it becomes easier for an ETC device utilization route to be selected.

Figure 5:
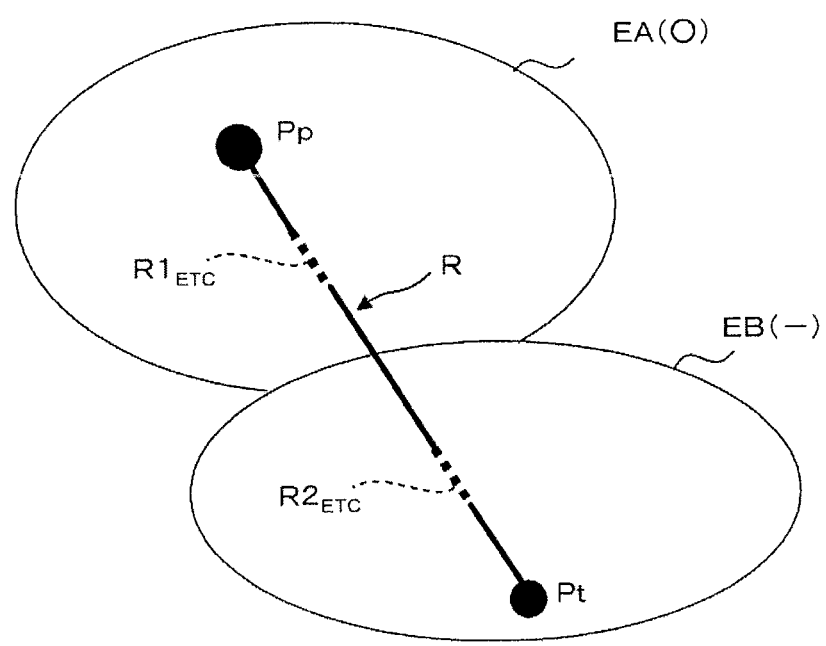
FIG. 5 is a drawing depicting an example of a route obtained by a route search.

By performing a route search in the ETCmax mode, for example, as depicted in FIG. 5, a route R from the current location Pp in the area EA (◯) in which the use of an ETC device is possible, to the destination Pt in the area EB adjacent to the area EA is retrieved. This retrieved route R, for example, includes an ETC device utilization route $R1_{ETC}$ in the area EA, and an ETC device utilization route $R2_{ETC}$ in the area EB.

When the route R from the current location Pp to the destination Pt is retrieved, the processing unit 11 sets that route as a guidance route (S14). Then, when the vehicle starts traveling, the processing unit 11 performs route guidance processing for guiding the vehicle along that route R (processing relating to audio guidance for guiding the vehicle along the route R, and display guidance and so forth on the map displayed on the display unit 13) (S15). While performing the route guidance processing (S15), the processing unit 11 repeatedly determines whether or not the vehicle has reached the border between the area EA in which the vehicle is currently traveling and the next area EB, namely, whether or not the vehicle is entering the next area EB (S16). Moreover, the border between the two areas EA and EB can be determined as a predetermined distance range on either side of the borderline (for example, a state borderline) between those two areas.

Figure 6:
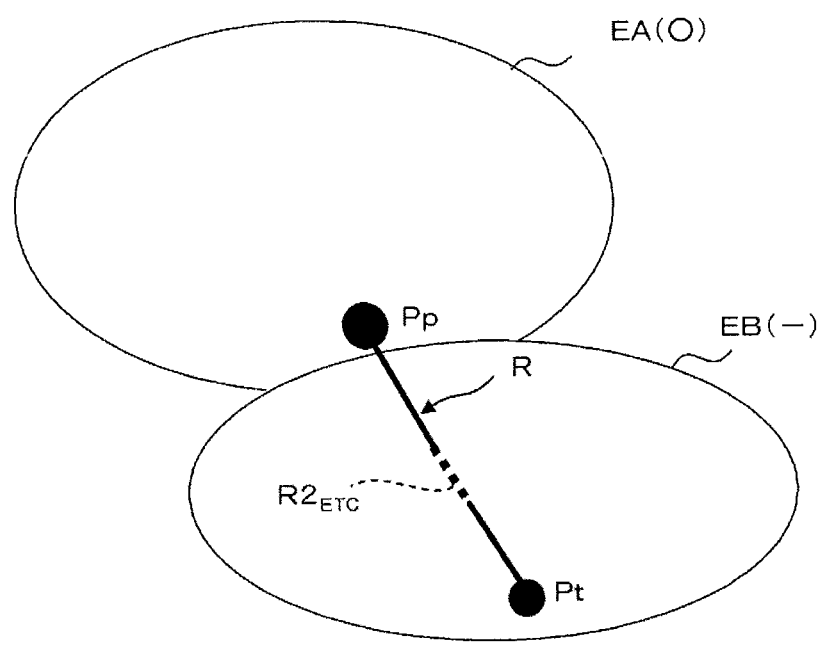
FIG. 6 is a drawing depicting a situation where a vehicle that is guided along the route depicted in FIG. 5 is entering an area in which a setting for whether or not the use of an ETC device is possible has not been performed.

When it is determined that the vehicle, as depicted in FIG. 6, has reached the border between the area EA and the next area EB, and that the vehicle is entering the next area EB (YES in S16), the processing unit 11 determines whether or not an ETC device utilization route is included in a portion of the route R in the next area EB along which the vehicle is guided (S17). If an ETC device utilization route is not included in that portion of the route R (NO in S17), because the vehicle does not need to use an ETC device when traveling through the area EB along the route R, the processing unit 11 continues to perform route guidance processing (S15) while confirming whether or not the vehicle has reached the border for the next area (S16).

However, as depicted in FIG. 6, if an ETC device utilization route $R2_{ETC}$ is included in a portion of the route R in the next area EB (YES in S17), the processing unit 11, in addition, refers to the ETC device usability setting table (see FIG. 3), and determines whether or not a setting for whether or not the use of an ETC device is possible has already been performed with respect to the next area EB (S18). If a setting for whether or not the use of an ETC device is possible has already been performed for the area EB (YES in S18), and, in addition, the setting details indicate that the use of an ETC device is possible (YES in S19), because it is possible for the ETC device mounted in the vehicle to be used in the next area EB, the processing unit 11 continues to perform route guidance processing (S15) for the vehicle along the route R (see FIG. 6) including the ETC device utilization route $R2_{ETC}$ even when the vehicle enters the area EB.

Furthermore, however, if a setting for whether or not the use of an ETC device is possible has not yet been performed for the area EB (NO in S18), the processing unit 11 moves to the procedure depicted in FIG. 4B, and executes processing for setting whether or not the use of an ETC device is possible for the area EB (S21: ETC usability setting means/area entry setting means).

In this processing (S21) for setting whether or not the use of an ETC device is possible, first, a screen such as that depicted in FIG. 7 is displayed on the display unit 13. Messages relating to each of: that the ETC device utilization route R2$_{ETC}$ is included in a portion of the route R in the next area EB into which the vehicle is entering; that there is a possibility of a fine being imposed if the ETC device of the vehicle is not registered for use in the area EB and cannot be used; and a query whether or not the area EB to be set as an area in which the use of an ETC device is possible, and also the three operation buttons "Yes", "No", and "Details", are displayed on the screen. The "Yes" button corresponds to a portion of the operation unit 12 (touch panel) for setting the area EB as an area in which the use of an ETC device is possible, the "No" button corresponds to a portion of the operation unit 12 (touch panel) for setting the area EB as an area in which the use of an ETC device is not possible, and the "Details" button corresponds to a portion of the operation unit 12 (touch panel) for causing the ETC device usability setting screen depicted in FIG. 2 to be displayed.

Figure 8:
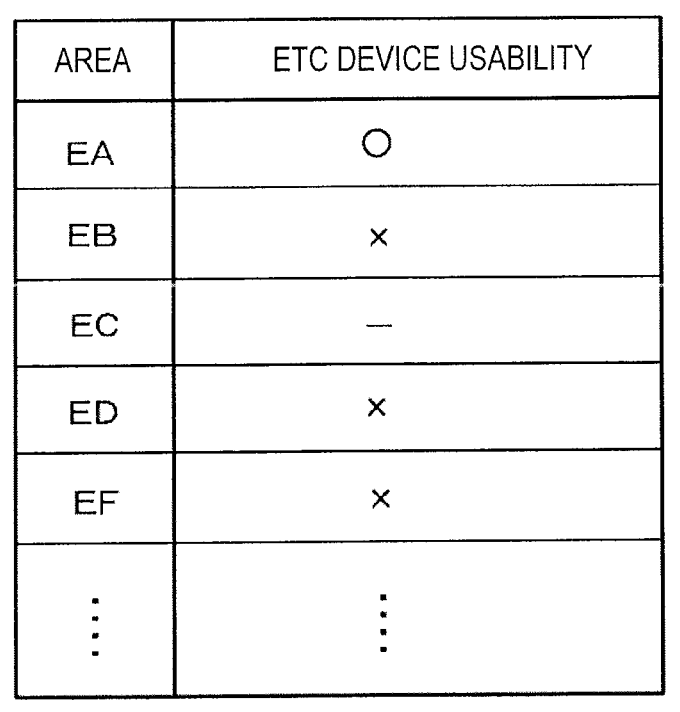

When the user operates the "No" button in the screen (see FIG. 7) of the display unit 13, as depicted in FIG. 8, information (symbol "×") indicating that the use of an ETC device is not possible is recorded with respect to the area EB in the ETC device usability setting table. However, when the user operates the "Yes" button in the screen of the display unit 13, information indicating that the use of an ETC device is possible is recorded with respect to the area EB in the ETC device usability setting table. In addition, when the user operates the "Details" button in the screen of the display unit 13, the ETC device usability setting screen such as that depicted in FIG. 2 is displayed on the display unit 13, and, as previously mentioned, it becomes possible to perform a setting as to whether or not the use of an ETC device is possible, with respect to each of all of the areas (for example, all of the states in the USA).

For example, when the "No" button is operated in the screen of the display unit 13 depicted in FIG. 7, and the use of an ETC device not being possible is set with respect to the area EB into which the vehicle is entering (S21: see the ETC device usability setting table depicted in FIG. 8), the processing unit 11 refers to the ETC device usability setting table, and confirms that the area EB into which the vehicle is entering is an area in which the use of an ETC device is not possible (NO in S22). In this case, even though the area EB (×) is an area in which the use of an ETC device is not possible, an ETC device utilization route R2$_{ETC}$ is included in a portion of the route R, along which the vehicle is guided, in the area EB (see FIG. 5). Therefore, the processing unit 11 (including the control means) acquires the current location of the vehicle on the basis of detection signals from the navigation sensor group 17 (S23), and performs a route search from that current location Pp to the destination Pt in an ETCmin mode instead of the ETCmax mode (S24: second route searching means). In the ETCmin mode, a route search is performed in accordance with a second cost condition including a condition regarding a route cost for which the route cost of an ETC device utilization route is higher than with the ETCmax mode in such a way that it becomes difficult for an ETC device utilization route to be selected.

Figure 9:
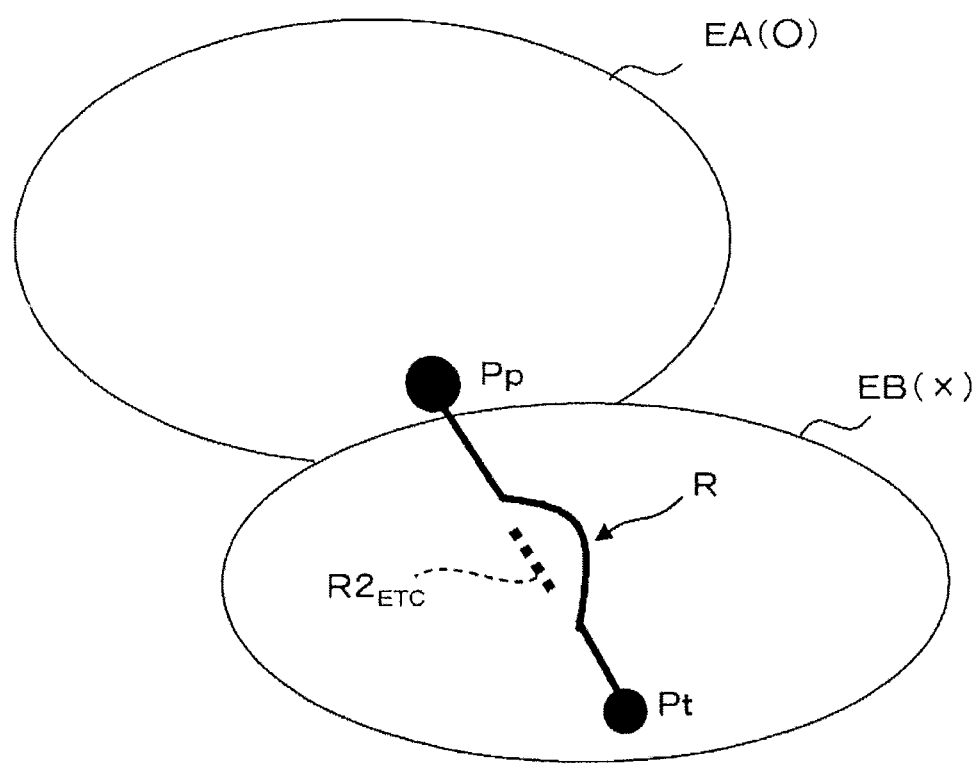
FIG. 9 is a drawing depicting an example of a route obtained by a re-search, in the situation depicted in FIG. 6.

As a result of the route search being performed in the ETCmin mode, for example, as depicted in FIG. 9, in the area EB (×) in which the use of an ETC device is not possible, a new route R including an ETC device non-utilization route is retrieved instead of the ETC device utilization route R2$_{ETC}$. The processing unit 11 then sets that new route R as the guidance route (S25), and performs route guidance processing for guiding the vehicle along that new route R (S26). As a result, in the area EB (×) in which the use of an ETC device is not possible, the vehicle can travel to the destination Pt along the route R for which route guidance is performed, without passing through the ETC device utilization route R2$_{ETC}$.

However, in the procedure of FIG. 4A, if the next area EB into which the vehicle is entering has already been set as an area in which the use of an ETC device is not possible (YES in S18, NO in S19), the processing unit 11, in the same manner as in the aforementioned case where that area EB is newly set as an area in which the use of an ETC device is not possible (NO in S18, see S23 to S26 in FIG. 4B), in the ETCmin mode, searches for a route R from the current location Pp of the vehicle to the destination Pt in accordance with the second cost condition with which it is difficult for an ETC device utilization route to be selected (second route searching means: see FIG. 9), and performs route guidance processing (S26) for the vehicle along the retrieved route R.

Furthermore, in the procedure of FIG. 4A, if the area to which the current location of the vehicle at the time of departure (acquired in S11) belongs is not an area in which the use of an ETC device is possible (NO in S12), to be specific, an area in which the use of an ETC device is not possible, or an area in which the possibility of using an ETC device has not been set, the processing unit 11 (including the control means/second initial control means) moves to the procedure depicted in FIG. 4B, and, in the same manner as previously mentioned, in the ETCmin mode, searches for a route R from the current location Pp of the vehicle to the destination Pt in accordance with the second cost condition for which it is difficult for an ETC device utilization route to be selected (S24: second route searching means). The processing unit 11 then sets the retrieved route as a guidance route (S25), and performs route guidance processing for the vehicle along that route (S26).

Figure 10:
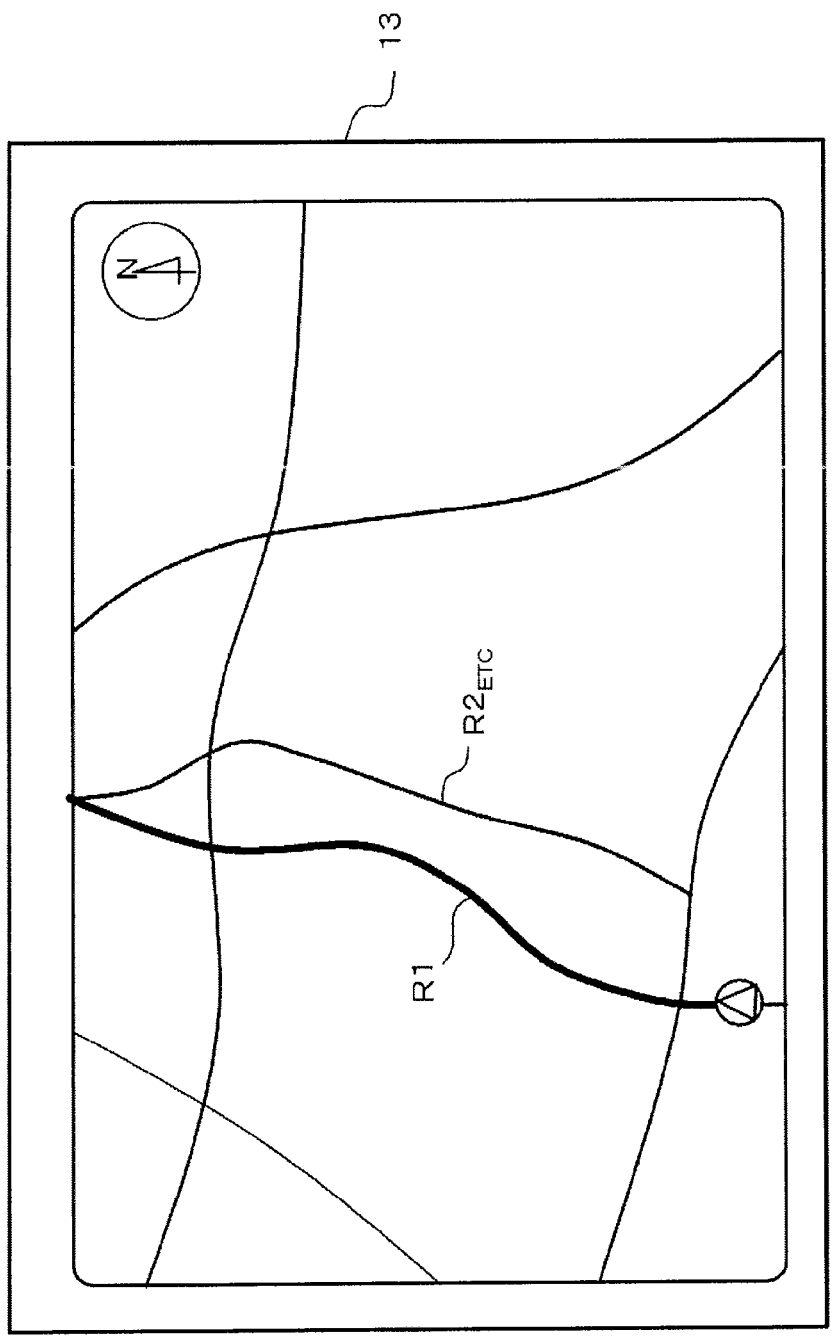
FIG. 10 is a drawing depicting an example of a display screen for guiding a vehicle along a route that does not include an ETC device utilization route.

In the process in which route guidance processing for the vehicle is performed along the route retrieved in accordance with the second cost condition for which it is difficult for an ETC device utilization route to be selected in the ETCmin mode, the processing unit 11 repeatedly determines whether or not a reroute search (reroute) condition has been met (S27). For example, if the vehicle travels along another route that deviates by a predetermined distance or more from the route R along which the vehicle should be guided, it can be deemed that the reroute search condition is met. For example, as depicted in FIG. 10, if a vehicle that is traveling while being guided along an originally retrieved route R1 (not including an ETC device utilization route) deviates from that route R1 due to a proactive driving operation by the user (driver) and travels along another route, resulting in the reroute search condition being met (YES in S27), the processing unit 11, once again, searches for a route from the current location Pp of the vehicle to the destination Pt in the ETCmin mode (S28). The processing unit 11 then determines whether or not the vehicle is traveling along an ETC device utilization route (S29).

Figure 11:
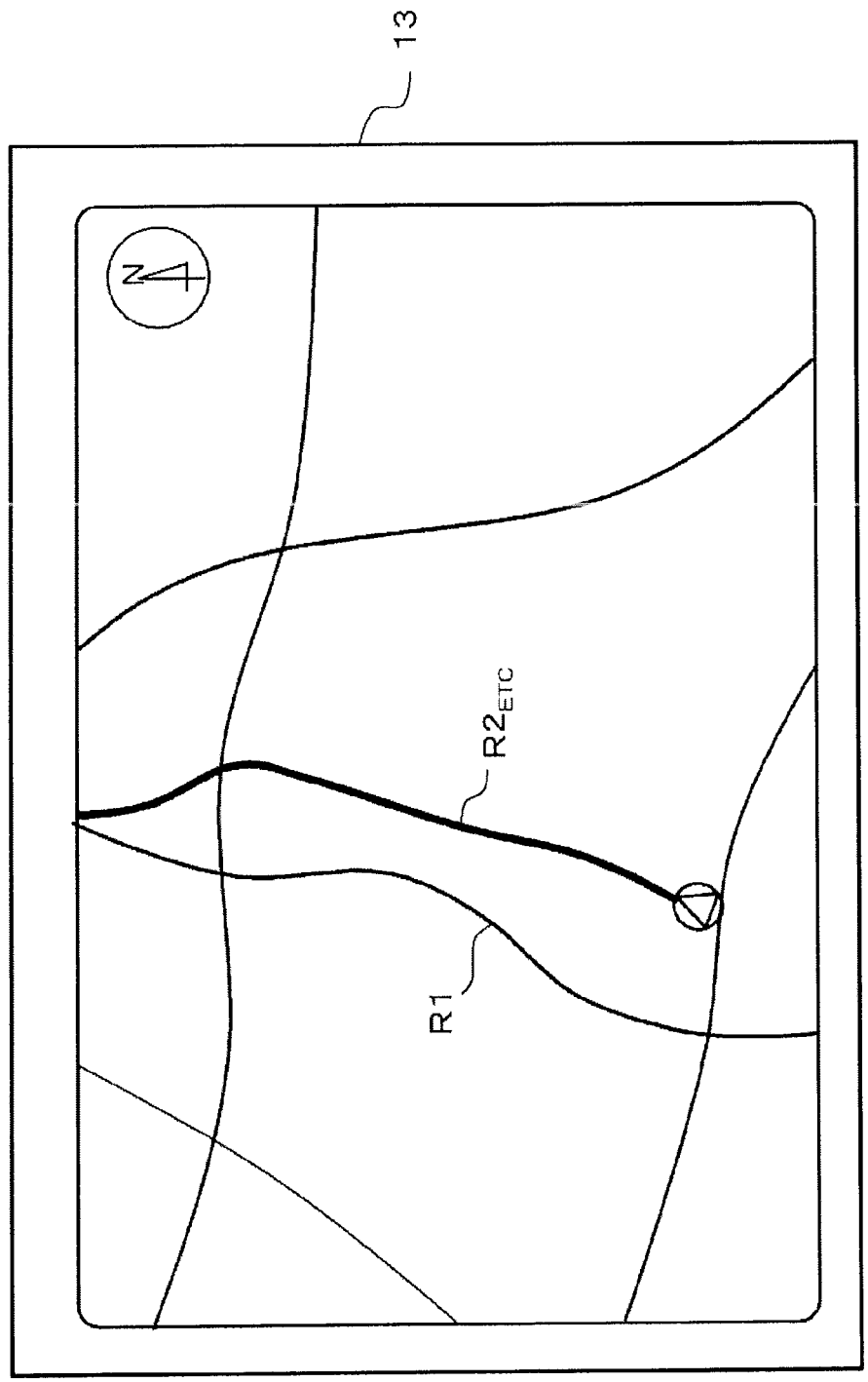
FIG. 11 is a drawing depicting an example of the display screen for performing guiding along a route for which a re-search is performed when the vehicle deviates from the route that does not include an ETC device utilization route depicted in FIG. 10 and travels along an ETC device utilization route.

If the vehicle travels along the ETC device utilization route $R2_{ETC}$ as depicted in FIG. 11 due to the proactive driving operation by the user, even in the case of a route that has been retrieved in the ETCmin mode, if the ETC device utilization route $R2_{ETC}$ is included in that route (YES in S29), the processing unit 11 sets the area including the ETC device utilization route $R2_{ETC}$ along which the vehicle travels as an area in which the use of an ETC device is possible (S30: ETC usability setting means/area travel setting means). Thereafter, the processing unit 11 sets a new route including that ETC device utilization route $R2_{ETC}$, as a guidance route (S25), and performs route guidance processing for guiding the vehicle along that route (S26).

In this way, if the vehicle travels along an ETC device utilization route due to a proactive driving operation by the user (YES in S29), the area including that ETC device utilization route is set as an area in which the use of an ETC device is possible (S30) without specially performing a setting operation for whether or not the use of an ETC device is possible. Therefore, a setting for it being possible to use an ETC device can be easily performed.

Moreover, if an ETC device utilization route is not included in the new route obtained by the reroute search (S28) in the ETCmin mode (NO in S29), the processing unit 11, without specially performing a setting with regard to whether or not the use of an ETC device is possible, sets that new route as a guidance route (S25), and performs route guidance processing along that route (S26).

In the aforementioned navigation device, when the ETC device usability setting screen (see FIG. 2) is used, or the vehicle traveling along a retrieved route R enters the next area, whether or not the use of the ETC device provided in the vehicle is possible can be set for each area in accordance with an operation performed by the user by means of the operation unit 12. Furthermore, if the vehicle traveling along the retrieved route R deviates from the route R due to a proactive driving operation by the user and travels along an ETC device utilization route, the area including that ETC device utilization route is automatically set as an area in which the use of an ETC device is possible.

Then, on the basis of the setting status (see the ETC device usability setting tables depicted in FIG. 3 and FIG. 8) for whether or not the use of the ETC device in each of those areas is possible, a route search from the current location Pp of the vehicle to the destination Pt is performed in accordance with either the ETCmax mode (using a first cost condition including a condition regarding the route cost of an ETC device utilization route decided in such a way that it becomes easier for an ETC device utilization route to be selected) or the ETCmin mode (second cost condition including a condition regarding a route cost for which the route cost of an ETC device utilization route is higher than that of the ETCmax mode in such a way that it becomes difficult for an ETC device utilization route to be selected). For example, if the current location Pp of the vehicle at the time of departure belongs to an area in which the use of an ETC device is possible, a route from that current location Pp to the destination Pt is retrieved in the ETCmax mode, and if the current location Pp of the vehicle at the time of departure belongs to an area in which the use of an ETC device is not possible, a route from that current location Pp to the destination Pt is retrieved in the ETCmin mode. In addition, for example, when the vehicle that is guided along the retrieved route R enters the area EB in which the use of ETC device is not possible, if an ETC device utilization route is included in a portion of that route R in the area EB, a re-search for a route is performed in the ETCmin mode using the second cost condition for which it is difficult for an ETC device utilization route to be selected.

In this way, according to the aforementioned navigation device, whether or not the use of the ETC device provided in a vehicle is possible can be set for each area, and since a route search from the current location of the vehicle to the destination is performed in either the ETCmax mode or the ETCmin mode on the basis of the setting status for whether or not the use of the ETC device is possible for each of those areas, it becomes possible to perform a route search in the ETCmin mode with regard to areas in which the use of an ETC device is not possible. As a result, in an area in which the use of an ETC device is not possible, it can be made to be difficult for an ETC device utilization route to be included in a retrieved route, and when the vehicle travels through an area in which the use of the ETC device provided in the vehicle is not possible, that vehicle can be prevented from being guided along an ETC device utilization route.

Moreover, although in the aforementioned navigation device a search is performed in the ETCmax mode if the current location Pp of the vehicle at the time of departure belongs to an area in which the use of an ETC device is possible, and a search is performed in the ETCmin mode if the current location Pp of the vehicle at the time of departure belongs to an area in which the use of an ETC device is not possible, the present invention is not restricted to this. For example, in a process in which a search is performed for a route from the current location of the vehicle to the destination by connecting sequential road links, it also becomes possible to search for subsequent road links in either the ETCmax mode or the ETCmin mode each time a road link enters a new area, in accordance with whether or not the use of an ETC device is possible in that area.

Figure 12:
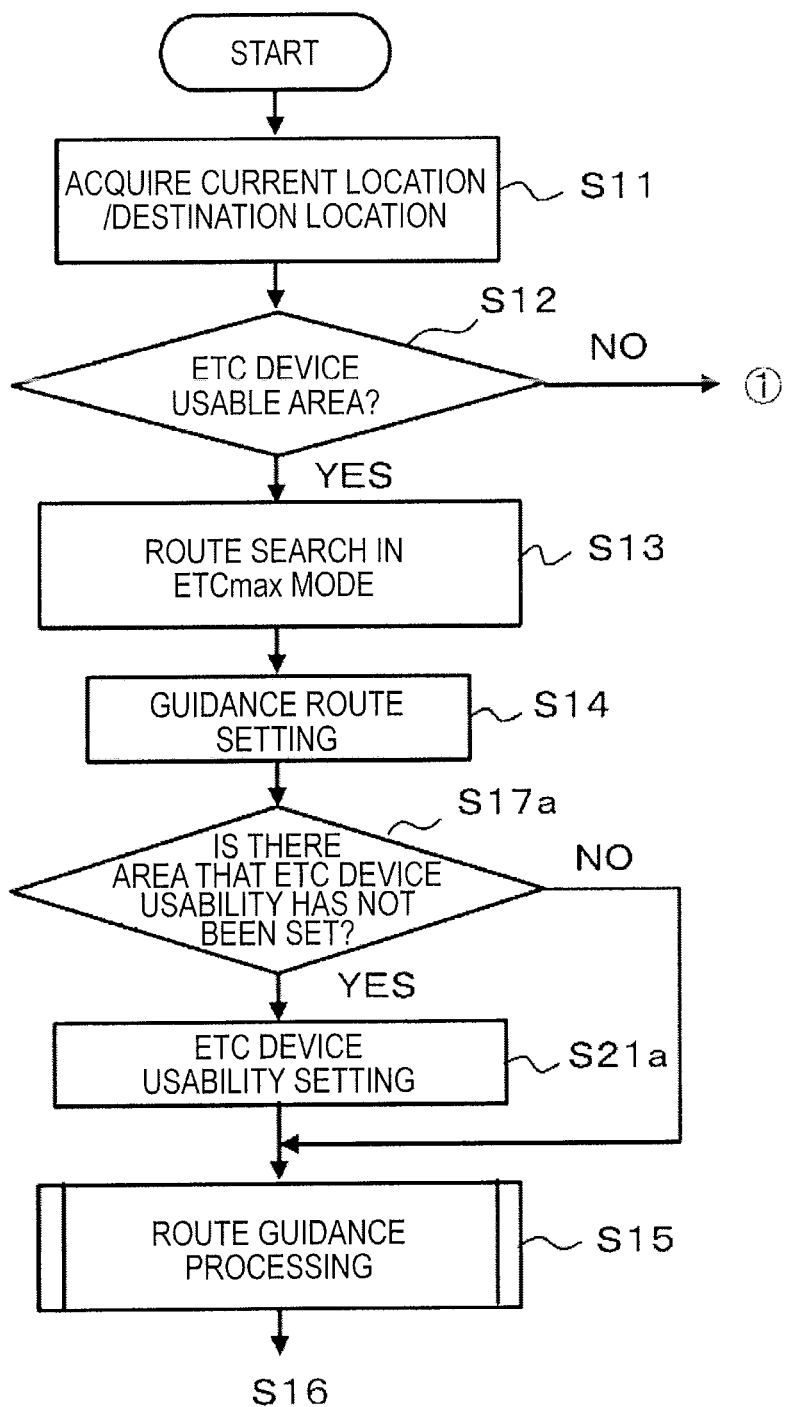
FIG. 12 is a flowchart depicting the flow of a first portion of other processing according to control regarding route searching and route guidance.
Figure 13:
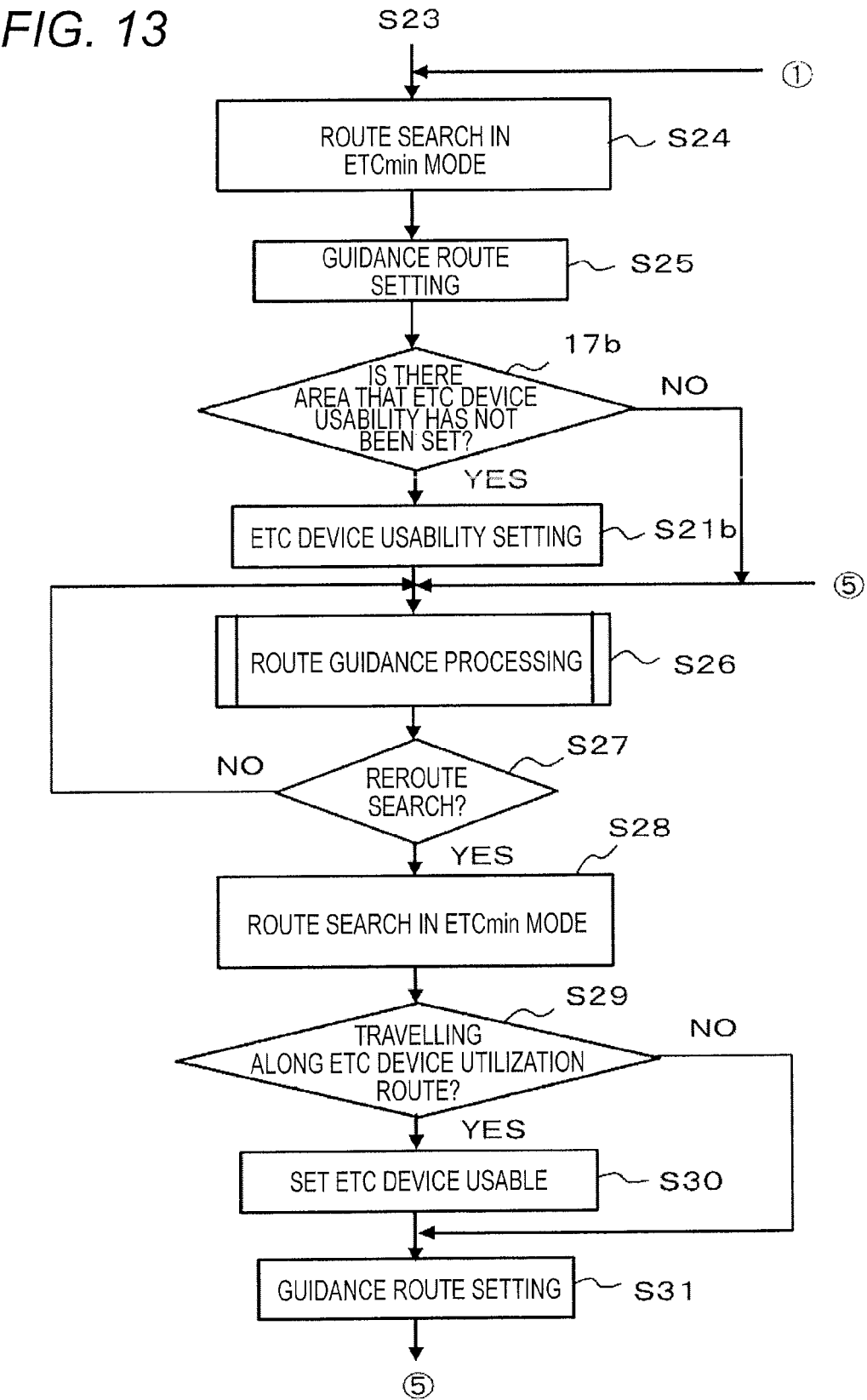
FIG. 13 is a flowchart depicting the flow of a second portion of other processing according to control regarding route searching and route guidance.

Furthermore, control processing for route searching and route guidance can be performed in accordance with the procedures depicted in FIG. 12 and FIG. 13 instead of the aforementioned procedures depicted in the FIG. 4A and FIG. 4B.

The procedure depicted in FIG. 12 has a configuration in which step S17*a* and step S21*a* are added between step S14 and step S15 in the procedure depicted in FIG. 4A. Moreover, in FIG. 12, the steps following step S15, although not depicted, are the same as those (S16 to S19) depicted in FIG. 4A.

In the control processing according to the procedure depicted in FIG. 12, if the current location Pp of the vehicle at the time of departure belongs to an area in which the use of an ETC device is possible, a search is performed for a route from the current location Pp to the destination Pt in the ETCmax mode, and the retrieved route R is set as a guidance route (S11 to S14). Thereafter, a determination is made as to whether or not that route R passes through an area for which a setting for whether or not the use of an ETC device is possible has not been performed (S17*a*), and if there is such an area (YES in S17*a*), processing (S21*a*: ETC usability setting means/route search setting means) for setting whether or not the use of an ETC device is possible is performed. This processing (S21*a*) for setting whether or not the use of an ETC device is possible may be performed by causing the aforementioned ETC device usability setting screen to be displayed on the display unit 13, may be performed by causing a screen such as that depicted in FIG. 7 to be displayed on the display unit 13 with respect to the areas through which the route R passes, and in addition may be performed in accordance with another technique.

The procedure depicted in FIG. 13 has a configuration in which step S17*b* and step S21*b* are added between step S25 and step S26 in the procedure depicted in FIG. 4B. Moreover, in FIG. 13, after a setting for whether or not the use of an ETC device is possible has been performed in step S30 with respect to an area, when it is determined in step S29 that the vehicle is not traveling along an ETC device utilization route (NO in S29), processing does not return to step S25 for guidance route setting as in the procedure of FIG. 4B, but proceeds to a new step S31 for guidance route setting. Even though there is this kind of difference, the actual content of the processing is the same.

In the control processing according to FIG. 13, if the current location Pp of the vehicle at the time of departure belongs to an area in which the use of an ETC device is not possible (NO in S12 in FIG. 12), a search for a route from the current location Pp to the destination Pt is performed in the ETCmin mode, and the retrieved route R is set as a guidance route (S24, S25). Thereafter, a determination is made as to whether or not that route R passes through an area for which a setting for whether or not the use of an ETC device is possible has not been performed (S17b), and if there is such an area (YES in S17b), processing (S21b: ETC usability setting means/route search setting means) for setting whether or not the use of an ETC device is possible is performed. As with step 21a depicted in FIG. 12, various techniques may be adopted for this processing (S21b) for setting whether or not the use of an ETC device is possible.

In a navigation device that performs control processing for route searching and route guidance according to the procedures depicted in FIG. 12 and FIG. 13, it is possible to set, at the time of departure of a vehicle, whether or not the use of an ETC device is possible for areas that the route along which the vehicle is guided passes through, and therefore when the vehicle that is traveling while being guided along that retrieved route enters the next area, it is not necessary to set whether or not the use of the ETC device is possible for that area. Namely, it is not necessary during driving for the user to perform an operation for setting whether or not the use of an ETC device is possible.

INDUSTRIAL APPLICABILITY

The navigation device according to embodiments of the present invention has the effect of being able to prevent a vehicle from being guided along an ETC device utilization route when that vehicle travels through an area in which the use of the ETC device provided in the vehicle is not possible, and is useful as a navigation device that searches for a route from the current location of the vehicle to the destination, and guides the vehicle along the retrieved route.

REFERENCE NUMERAL LIST

11 Processing unit
12 Operation unit
13 Display unit
14 Storage unit
15 Output circuit
16 Speaker
17 Navigation sensor group While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device that is mounted in a vehicle provided with an ETC device for which usable geographic areas from among a plurality of geographic areas are limited, searches for a route from a current location of the vehicle to a destination, and guides the vehicle along a retrieved route, the navigation device comprising:
    an ETC usability setting means that sets and stores, for each of the plurality of geographic areas, whether or not use of the ETC device is possible in the area;
    a first route searching means that performs a route search in accordance with a first cost condition including a condition regarding a route cost of an ETC device utilization route;
    a second route searching means that performs a route search in accordance with a second cost condition including a condition regarding a route cost for which the route cost of an ETC device utilization route is higher than with the first cost condition; and
    a control means that, on the basis of a setting status for whether or not use of the ETC device in an area according to the ETC usability setting means is possible, controls whether to perform a route search by means of the first route searching means when the use of the ETC device in the area is possible, or the second route searching means when the use of the ETC device in the area is not possible;
    wherein the control means comprises a first initial control means that, if the current location of the vehicle at the time of departure is included in an area in which use of the ETC device is possible according to the ETC usability setting means, causes the first route searching means to search for a route from the current location to the destination;
    wherein the control means comprises a second initial control means that, if the current location of the vehicle at the time of departure is included in an area in which use of the ETC device is not possible according to the ETC usability setting means, causes the second route searching means to search for a route from the current location to the destination; and
    wherein, when the vehicle that is guided along a route retrieved by the first route searching means enters an area in which the ETC usability setting means has set that use of the ETC device is not possible, if an ETC device utilization route is included in a portion of the route in the area, the control means causes the second route searching means to search for a new route from the current location of the vehicle to the destination, and guides the vehicle along the new route.

2. The navigation device according to claim 1,
    wherein the ETC usability setting means comprises an area entry setting means that, when the vehicle that is guided along a retrieved route enters an area in which a setting for whether or not use of the ETC device is possible has not been performed, sets whether or not use of the ETC device is possible for the area.

3. The navigation device according to claim 2,
    wherein, when the vehicle that is guided along a route retrieved by the first route searching means enters an area in which a setting for whether or not use of the ETC device is possible has not been performed, if an ETC device utilization route is included in a portion of the route in the area, the area entry setting means sets whether or not use of the ETC device is possible for the area.

4. The navigation device according to claim 1, wherein the ETC usability setting means comprises a selection setting means that selects an area from the plurality of areas, and sets that use of the ETC device is possible for the selected area.

5. The navigation device according to claim 1, wherein the ETC usability setting means comprises an area travel setting means that, if the vehicle that is guided along a route retrieved by the second route searching means travels along an ETC device utilization route instead of an ETC device non-utilization route included in the route, sets an area including the ETC device utilization route as an area in which use of the ETC device is possible.

6. The navigation device according to claim 5, wherein, if the vehicle is guided along an ETC device utilization route included in a route for which a re-search is performed by the second route searching means in accordance with a travel route of the vehicle, the area travel setting means sets an area including the ETC device utilization route as an area in which use of the ETC device is possible.

7. The navigation device according to claim 1, wherein the ETC usability setting means comprises a route search setting means that, when a search is performed for a route by either the first route searching means or the second route searching means, if a retrieved route passes through an area in which a setting for whether or not the use of the ETC device is possible has not been performed, sets whether or not use of the ETC device is possible for the area.

8. A method of operating a navigation device that is mounted in a vehicle provided with an ETC device for which usable geographic areas from among a plurality of geographic areas are limited, searches for a route from a current location of the vehicle to a destination, and guides the vehicle along a retrieved route, the method comprising:
  setting and storing, for each of the plurality of geographic areas, whether or not use of the ETC device is possible in the area;
  providing a first route searching that performs a route search in accordance with a first cost condition including a condition regarding a route cost of an ETC device utilization route;
  providing a second route searching that performs a route search in accordance with a second cost condition including a condition regarding a route cost for which the route cost of an ETC device utilization route is higher than with the first cost condition; and
  controlling, on the basis of a setting status for whether or not use of the ETC device in an area is possible, whether to perform a route search using the first route searching when the use of the ETC device in the area is possible or the second route searching when the use of the ETC device in the area is not possible;
  wherein when the searched route is formed by connecting sequential road links, the route search for subsequent road links is performed when a road link enters a new geographic area using the first route searching if the use of the ETC device in the new geographic area is possible, or using the second route searching if the use of the ETC device in the new geographic area is not possible.

9. The method according to claim 8, wherein setting the ETC usability, when the vehicle that is guided along a retrieved route enters an area in which a setting for whether or not use of the ETC device is possible has not been performed, comprises setting whether or not use of the ETC device is possible for the area.

10. The method according to claim 9, wherein, when the vehicle that is guided along a route retrieved by the first route searching enters an area in which a setting for whether or not use of the ETC device is possible has not been performed, if an ETC device utilization route is included in a portion of the route in the area, setting whether or not use of the ETC device is possible for the area.

11. The method according to claim 8, wherein setting the ETC usability comprises receiving a selection of an area from the plurality of areas, and setting whether use of the ETC device is possible for the selected area.

12. The method according to claim 8, wherein setting the ETC usability comprises, if the vehicle that is guided along a route retrieved by the second route searching travels along an ETC device utilization route instead of an ETC device non-utilization route included in the route, setting an area including the ETC device utilization route as an area in which use of the ETC device is possible.

13. The method according to claim 12, wherein, if the vehicle is guided along an ETC device utilization route included in a route for which a re-search is performed by the second route searching in accordance with a travel route of the vehicle, setting an area including the ETC device utilization route as an area in which use of the ETC device is possible.

14. The method according to claim 8, wherein setting the ETC usability comprises, when a search is performed for a route by either the first route searching or the second route searching, if a retrieved route passes through an area in which a setting for whether or not the use of the ETC device is possible has not been performed, setting whether or not use of the ETC device is possible for the area.

* * * * *